United States Patent [19]
Wong

[11] Patent Number: 6,104,410
[45] Date of Patent: Aug. 15, 2000

[54] METHOD AND APPARATUS FOR DISPLAYING STACKED SYMBOLS TO CREATE A MULTI-DIMENSIONAL VIEW

[75] Inventor: Shui-Ying Wong, 5562 Caithness Ct., Fairfax, Va. 22032-3834

[73] Assignee: Shui-Ying Wong, Fairfax, Va.

[21] Appl. No.: 08/784,066

[22] Filed: Jan. 17, 1997

[51] Int. Cl.[7] .................................................. G06T 11/00
[52] U.S. Cl. ............................................................. 345/440
[58] Field of Search .................................... 345/419, 440, 345/435

[56] References Cited

U.S. PATENT DOCUMENTS

| | | | |
|---|---|---|---|
| 5,228,119 | 7/1993 | Mihalisin et al. | 345/418 |
| 5,461,708 | 10/1995 | Kahn | 345/440 |
| 5,491,779 | 2/1996 | Bezjian | 345/440 |
| 5,509,112 | 4/1996 | Doi et al. | 345/440 |
| 5,553,209 | 9/1996 | Johnson et al. | 345/433 |
| 5,553,211 | 9/1996 | Uotani | 345/435 |
| 5,623,590 | 4/1997 | Becker et al. | 345/440 |

OTHER PUBLICATIONS

Tufte, Edward R., The Visual Display of Quantitative Information, p. 119, 1983.

*Primary Examiner*—Mark K. Zimmerman
*Assistant Examiner*—Albert K. Lee
*Attorney, Agent, or Firm*—Marc S. Kaufman

[57] ABSTRACT

The current invention provides both location and magnitude representations in a geographic information system (GIS) environment. To indicate the locations, symbols are plotted on a map. To indicate magnitude, repeated symbols are stacked on top of each other. The higher the stack of symbols, the bigger the magnitude. The number of symbols to be stacked will be proportional to any scaling scheme. The position or coordinate of the symbols to be stacked will be based on any mathematical function. The size the symbols to be stacked will be based on any mathematical function. The color of the symbols to be stacked will be based on any function applicable to color. The shape of the symbols to be stacked will be based on any function applicable to shape or object, or according to a look-up table.

15 Claims, 43 Drawing Sheets

| A | B |
|---|---|
| Army St - Bartlett St | 6 |
| Army St - Bayshore Blvd | 5 |
| Army St - Bryant St | 4 |
| Army St - Church St | 14 |
| Army St - Connecticut St | 3 |
| Army St - Dolores St | 12 |
| Army St - Evans Av | 1 |
| Army St - Florida St | 3 |
| Army St - Folsom St | 13 |
| Army St - Guerrero St | 17 |
| Army St - Hampshire St | 5 |
| Army St - Harrison St | 8 |
| Army St - Indiana St | 8 |
| Army St - Kansas St | 4 |
| Army St - Missouri St | 3 |
| Army St - Pennsylvania Av | 1 |
| Army St - Shotwell St | 1 |
| Army St - Tennessee St | 11 |
| Army St - Valencia St | 1 |
| Castro St - Chenery St | 5 |
| Castro St - Clipper St | 6 |
| Castro St - Duboce Av | 1 |
| Castro St - Duncan St | 3 |
| Castro St - Hill St | 2 |
| Castro St - States St | 1 |
| Church St - Clipper St | 4 |
| Church St - Day St | 2 |
| Church St - Duboce Av | 11 |
| Church St - Jersey St | 1 |
| Church St - Liberty St | 4 |
| Church St - Market St | 4 |
| Church St - Reservoir St | 1 |
| Day St - Dolores St | 1 |
| Diamond St - Duncan St | 1 |
| Diamond St - Jersey St | 1 |
| Diamond St - Market St | 1 |
| Diamond St - Wilder St | 1 |
| Duncan St - Guerrero St | 1 |
| Noe St - Valley St | 1 |

FIG. 6

```
Include "symbo_2.def"

Declare Sub Aims_dlg(line1,line2,line3,line4,line5 as
string)'Provide dialog for message
Declare Sub Main                'The main precess of the accident
subsystem
Declare Sub PlotOkSub_int       'Set the plot condition OK
Declare Sub map_file
Declare Sub data_file
Declare Sub coordinate_file
Declare Sub Plot_graph
Declare Sub data_loc_column
Declare Sub Coord_loc_column
Declare Sub Get_data_loc_column_no
Declare Sub Get_coord_loc_column_no
Declare Sub Get_plot_option
Declare Sub Get_plot_value_column_no
Declare Sub Symbol_style
Declare Sub Stack_style
Declare Sub Plot_column_coordinate
Declare Sub Plot_frequency_coordinate
Declare Sub Plot_column_no_coordinate
Declare Sub Plot_frequency_no_coordinate
Declare Sub New_selection
Declare Sub Quit_SymboGraph '----------------------------------------------------
'   Sub Main
'This is the main program for the patent
' Modified from Subroutine PLOT_INT
'
'----------------------------------------------------
Sub Main Dim plotnum,i,num, No_of_table   as smallint
Dim x, y as float
Dim st_list,Query_tab,Table_name as string
Dim temp_table as string Alter Menu Bar add "&SymboGraph"

Create Menu "&SymboGraph" As
   "Do items 1, 2 and 3 first",
   "!1: Open &map file" ID 601 calling map_file,
```

FIG. 10A

```
   "!2a: Open &data file" ID 603 calling data_file,
   "!2b: &Data file specifications" ID 615 calling
data_loc_column,
   "(!3a: Open file with &coordinates" ID 605 calling
coordinate_file,
   "(!3b: Coordinates &file specifications" ID 617 calling
coord_loc_column,
   "(-",
   "Define &symbol style" ID 607 Calling symbol_style,
   "Define s&tack style"  ID 609 calling stack_style,
   "(-",
   "&Plot graph" ID 619 Calling plot_graph,
   "(-",
   "&New selection" ID 621 Calling New_selection,
   "(-",
   "&Quit SymboGraph" ID 623 Calling Quit_SymboGraph Menu Bar Show '''Initialize values here
Map_filename=""
Data_filename=""
Coordinate_filename=""
data_loc_column_no = 0  '''at this point, user has not select
which column contains location
                         '''information, hence
data_loc_column_no=0
coord_loc_column_no = 0  '''at this point, user has not select
which column contains location
no_per_symbol=1
plotmin=0
plotsymbol=Makesymbol(32,Red,8)
Offset_x = 0.1
Offset_y = 0.1
exponent_x = 1.0   '''default exponent value
exponent_y = 1.0   '''default exponent value
plot_tab_open = 0
default_no_per_symbol = 1   '''initial value
default_no_per_symbol_defined = 0   '''user has not opened
symbol style dialog
Summary_open =0   '''initially this table is not created
coordinate_table_open = 0   '''initially this table is not
opened, 0=not open, 1=open
```

FIG. 10B

```
data_table_open = 0          '''initially this table is not
opened
map_table_open = 0           '''initially this table is not
opened
map_table_no = 1    '''initial map file no.
data_col_popup = 1  '''initial value display in popup menu
plot_col_popup = 1  '''initial value display in popup menu End Sub
'''***********************************************************
***

'''***********************************************************
***
Sub Plot_graph Dim plotnum,i,No_of_table  as integer
Dim x, y as float
Dim st_list,Query_tab,Table_name as string
Dim temp_table as string
Dim coord_loc_col, plot_value, plot_value_col as alias
Dim data_loc_col_type as smallint
Dim data_loc_col_width as smallint
Dim first_record_value as integer
Dim num as integer Set Style Symbol plotsymbol '''to set user selected symbol
style '''   data_loc_col = ColumnInfo(data_table,
"COL"+data_loc_column_no, COL_INFO_NAME)
'''   data_loc_col_type = ColumnInfo(data_table,
"COL"+data_loc_column_no, COL_INFO_TYPE)
data_loc_col_width = ColumnInfo(data_table,
"COL"+data_loc_column_no, COL_INFO_WIDTH)

If (plot_tab_open = 1) then
  Close table plot_tab
  plot_tab_open = 0
End if

Create Table Plot_tab
   (Location Char(data_loc_col_width),
     Value float)
```

FIG. 10C

```
Create Map For Plot_tab
plot_tab_open = 1

If (default_no_per_symbol_defined = 0) and (plot_option = 1)
then   '''if user not opened symbol style dialog
   Fetch First From data_table
    first_record_value = data_table.col(plot_value_column_no)
    default_no_per_symbol = Maximum
(Int(first_record_value/10),1)
   no_per_symbol = default_no_per_symbol
End if '*****Depending on user's choice: plot from column value or
frequency count
'*****                             has coordinates or not, go
to different subroutines If (Plot_option = 1) and (geo_coded = 1) then '''plot from
column, has coordinates
   Call Plot_column_coordinate
   Exit sub
ElseIf (Plot_option = 2) and (geo_coded = 1) then '''plot
from frequency, has coordinates
   Call Plot_frequency_coordinate
   Exit sub
ElseIf (Plot_option = 1) and (geo_coded = 2) then '''plot
from column, no coordinates
   Call Plot_column_no_coordinate
   Exit sub
ElseIf (Plot_option = 2) and (geo_coded = 2) then '''plot
from frequency, no coordinates
   Call Plot_frequency_no_coordinate
   Exit sub
Else
   Note "Data specifications are not defined, re-do 'Data
Specifications' again!"
End if End Sub
'''*****************************************************

'''*****************************************************
Sub Plot_column_coordinate
```

FIG.10D

```
Dim plotnum,i as integer
Dim x, y as float
Dim st_list as string
Dim coord_loc_col, plot_value, plot_value_col as alias
Dim data_loc_col_type as smallint
Dim data_loc_col_width as smallint
Dim first_record_value as integer
Dim num as integer Fetch First From data_table
  plotnum=0
  Recordnum=1
Do
  st_list = data_table.col(data_loc_column_no)
  num=data_table.col(plot_value_column_no)
  If num>=plotmin Then
      x=CentroidX(data_table.obj)
      y=CentroidY(data_table.obj)
      plotnum=Int(num/no_per_symbol)
      If (num Mod no_per_symbol) > 0 then
         plotnum=Plotnum+1
      End if
      For i=1 To plotnum
         Insert Into Plot_tab
           (obj,location,Value)
           Values (CreatePoint(x+(offset_x*(i-
1))^(exponent_x),y+(offset_y*(i-
1))^(exponent_y),),st_list,num)
      Next
  End If
  Recordnum=Recordnum+1
  Fetch Next From data_table
Loop Until EOT(data_table)
commit table plot_tab
Add Map Layer Plot_tab End Sub
'''*************************************************
***

'''*************************************************
****
Sub Plot_frequency_coordinate
```

FIG. 10E

```
Dim plotnum,i as integer
Dim x, y as float
Dim st_list as string
Dim coord_loc_col, plot_value, plot_value_col as alias
Dim data_loc_col_type as smallint
Dim data_loc_col_width as smallint
Dim first_record_value as integer
Dim num as integer data_loc_col = ColumnInfo(data_table,
"COL"+data_loc_column_no, COL_INFO_NAME)

If (Summary_open = 1) then
  close table Summary
  Summary_open = 0
End if

Select data_loc_col,count(*)"Count",
CentroidX(data_table.obj)"X", CentroidY(data_table.obj)"Y"
  from data_table
  Where obj
  into Summary
  Group By data_loc_col Summary_open =1

Fetch First From Summary
  plotnum=0
  Recordnum=1
Do
  st_list=Summary.col1
  num=Summary.col2
  If num>=plotmin Then
      x=Summary.col3 '''CentroidX(Summary.obj)
'''ObjectGeography(Summary.obj, OBJ_GEO_POINTX)
      y=Summary.col4 '''CentroidY(Summary.obj)
'''ObjectGeography(Summary.obj, OBJ_GEO_POINTY)
      plotnum=Int(num/no_per_symbol)
      If (num Mod no_per_symbol) > 0 then
        plotnum=Plotnum+1
      End if
      For i=1 To plotnum
        Insert Into Plot_tab
          (obj,location,Value)
```

FIG. 10F

```
      Values (CreatePoint(x+(offset_x*(i-
1))^(exponent_x),y+(offset_y*(i-
1))^(exponent_y),),st_list,num)
      Next
  End If
  Recordnum=Recordnum+1
  Fetch Next From Summary
Loop Until EOT(Summary)
Add Map Layer Plot_tab Commit Table Plot_tab   '''if not commited, a dialog will
appear, asking if you want to
                        '''save table Plot_tab before
closing MapInfo.

End sub
'''***********************************************************
***

'''***********************************************************
Sub Plot_column_no_coordinate Dim plotnum,i as integer
Dim x, y as float
Dim st_list as string
Dim coord_loc_col, plot_value, plot_value_col as alias
Dim data_loc_col_type as smallint
Dim data_loc_col_width as smallint
Dim first_record_value as integer
Dim num as integer coord_loc_col = ColumnInfo(coordinate_table,
"COL"+coord_loc_column_no, COL_INFO_NAME)
plot_value_col = ColumnInfo(data_table,
"COL"+plot_value_column_no, COL_INFO_NAME)
data_loc_col = ColumnInfo(data_table,
"COL"+data_loc_column_no, COL_INFO_NAME)

If (Summary_open = 1) then
  close table Summary
  Summary_open = 0
End if

Select data_loc_col,plot_value_col
```

FIG. 10G

```
   from data_table
   into Summary

Summary_open = 1

Fetch First From Summary
   plotnum=0
   Recordnum=1
Do
   Find Using coordinate_table(coord_loc_col)
   st_list=Summary.col1
   num=Summary.col2
   If num>=plotmin Then
      Find st_list
      If CommandInfo(CMD_INFO_FIND_RC)>=1 Then
         x=CommandInfo(CMD_INFO_X)
         y=CommandInfo(CMD_INFO_Y)
         plotnum=Int(num/no_per_symbol)
         If (num Mod no_per_symbol) > 0 then
            plotnum=Plotnum+1
         End if
         For i=1 To plotnum
            Insert Into Plot_tab
               (obj,Location,Value)
               Values (CreatePoint(x+(offset_x*(i-
1))^(exponent_x),y+(offset_y*(i-
1))^(exponent_y),),st_list,num)
         Next
      End If
   End If
   Recordnum=Recordnum+1
   Fetch Next From Summary
Loop Until EOT(Summary)
Add Map Layer Plot_tab
Commit Table Plot_tab   '''if not commited, a dialog will
appear, asking if you want to
                        '''save table Plot_tab before
closing MapInfo.
End sub
'''*******************************************************

'''*******************************************************
Sub Plot_frequency_no_coordinate
```

FIG. 10H

```
Dim plotnum,i as integer
Dim x, y as float
Dim st_list as string
Dim coord_loc_col, plot_value, plot_value_col as alias
Dim data_loc_col_type as smallint
Dim data_loc_col_width as smallint
Dim first_record_value as integer
Dim num as integer coord_loc_col = ColumnInfo(coordinate_table,
"COL"+coord_loc_column_no, COL_INFO_NAME)
data_loc_col = ColumnInfo(data_table,
"COL"+data_loc_column_no, COL_INFO_NAME)

If (Summary_open = 1) then
  close table Summary
  Summary_open = 0
End if

Select data_loc_col,count(*)"Count"
      from data_table
      into Summary
      Group By data_loc_col Summary_open =1

Fetch First From Summary
  plotnum=0
  Recordnum=1
Do
  Find Using coordinate_table(coord_loc_col)
  st_list=Summary.col1
  num=Summary.col2
  If num>=plotmin Then
    Find st_list
    If CommandInfo(CMD_INFO_FIND_RC)>=1 Then
      x=CommandInfo(CMD_INFO_X)
      y=CommandInfo(CMD_INFO_Y)
      plotnum=Int(num/no_per_symbol)
      If (num Mod no_per_symbol) > 0 then
        plotnum=Plotnum+1
      End if
      For i=1 To plotnum
        Insert Into Plot_tab
```

FIG. 10I

```
            (obj,location,Value)
            Values (CreatePoint(x+(offset_x*(i-
1))^(exponent_x),y+(offset_y*(i-
1))^(exponent_y),),st_list,num)
       Next
     End If
  End If
  Recordnum=Recordnum+1
  Fetch Next From Summary
Loop Until EOT(Summary)

Add Map Layer Plot_tab
Commit Table Plot_tab   '''if not commited, a dialog will
appear, asking if you want to
                         '''save table Plot_tab before
closing MapInfo.

End sub
'''*********************************************************

'*************************************************
'Subroutine:  Symbol_style PlotSub_int   Modifed from
PlotSub_int, PlotSub
'Modified Date:       2/16/96
'Function:    This subroutine is to set the current symbol
'Called by:
'
'Calls:
'*************************************************

Sub Symbol_style

Dim data_loc_col_type as smallint
Dim data_loc_col_width as smallint
Dim first_record_value as integer
Dim plot_value,plot_value_col, coord_loc_col as alias Set style symbol plotsymbol OnError goto Error_3
If (default_no_per_symbol_defined = 0) and (plot_option = 1)
then
   Fetch First From data_table
     first_record_value = data_table.col(plot_value_column_no)
```

FIG. 10J

```
    default_no_per_symbol = Maximum
(Int(first_record_value/10),1)
Elseif (default_no_per_symbol_defined = 1) then
    default_no_per_symbol = no_per_symbol
Else
End if Dialog
      Title "Plot Specification"
    Width   190
    Height  120

Control StaticText
        Title "Data value per each symbol:" Position 5,10
    Control Edittext
        Value Str$(default_no_per_symbol) Position 113,8
        ID 1
        Width 50
    Control StaticText
        Title "Plot locations with values >= " Position 5,33
    Control Edittext
        Value Str$(plotmin) Position 113,31
        ID 3
        Width 50
    Control StaticText
        Title "Click below to select shape, color and size
of symbol:" Position 5,56
    Control SymbolPicker
        Position 75,72
        ID 2
    Control CancelButton
        Title "Cancel"          Position 20,100
    Control OkButton
        Title "OK"              Position 100,100
        Calling PlotOkSub_int If not CommandInfo(CMD_INFO_DLG_OK) then
    exit sub
end if '''If cancel in dialog is check, exit the subroutine default_no_per_symbol_defined = 1
Goto Final_statement Error_3:
```

FIG. 10K

```
Note "Data file specifications are not defined, try 'Data
file specifications' again!"
Exit Sub Final_statement:
End Sub
'''***********************************************

'''***********************************************
Sub PlotOkSub_int plotsymbol=ReadControlValue(2)

no_per_symbol=Val(ReadControlValue(1))
plotmin=Val(ReadControlValue(3))
End Sub
'''***********************************************

'''***********************************************
Sub map_file

Dim map_tab as string
Dim No_before_map_open as smallint map_filename=FileOpenDlg("", "", "TAB", "Open Map File")
If (map_filename <> "") then   '''If user open dialog and chek
cancel, will produce error.
                               '''This if statement prevents
that.
   map_tab = "map_table" + Str$(map_table_no)
   OnError goto Error_1  '''open the same map filename will get
an error message. This prevents it.
   Open Table Map_filename as map_tab Interactive    '''make
map_table as the alias name to be refer to
   Map From map_tab
   map_window_id=FrontWindow()'''define map_window_id to
represent the id of the map
   map_scale = MapperInfo(map_window_id, MAPPER_INFO_SCALE)
   offset_x = (0.01/69.171)*map_scale    '''default offset
value
   offset_y = (0.01/69.171)*map_scale    '''default offset
value
```

FIG.10L

```
    If (map_table_open = 1) then    '''This mean another map has
been opened before
    Alter Menu Item ID 603 Uncheck '''therefore uncheck "Open
&data file" ID 603 again.
    Alter Menu Item ID 615 Uncheck '''therefore uncheck "Data
file specifications" ID 615 again
  End if
  map_table_open = 1
  map_table_no = map_table_no + 1   '''can repeat openning
many maps, keep track how many map has opened
    Alter Menu Item ID 601 Check ''''"Open &map file" ID 601
calling map_file
End if
Goto End_statement Error_1:
Note "You cannot open the same map filename twice."
      + Chr$(10)
      + Chr$(10) + "If you want to use the same map file,"
      + Chr$(10)
      + Chr$(10) + "Copy it to another name and try again."
Exit Sub End_statement:
End Sub

'''*************************************************

'''*************************************************
Sub data_file

Dim file_type, data_tab as string data_filename=FileOpenDlg("", "", "TAB", "Open Data File")

If (data_filename <> "") then   '''If user open dialog and chek
cancel, will produce error.
                                '''This if statement prevents
that.
   If (data_table_open = 1) then   '''if table has been open
before, close it first.
      close table data_table       '''Else will get error
      data_table_open = 0
```

FIG. 10M

```
    End if
    file_type = Right$(data_filename, 3)
    Do case file_type
      Case "TAB"
        Open Table data_filename as data_table
        data_table_open = 1
        Alter Menu Item ID 603 Check '''"!Open &data file" ID
603 calling data_file,
      Case "DBF"
        Register table data_filename Type "DBF" into "data_tab"
        Open table "data_tab" as data_table
        data_table_open = 1
      Case "WKS"
        Register table data_filename Type "WKS" into "data_tab"
        Open table "data_tab" as data_table
        data_table_open = 1
      Case "XLS"
        Register table data_filename Type "XLS" into "data_tab"
        Open table "data_tab" as data_table
        data_table_open = 1
      Case "TXT"
        Register table data_filename Type "ASCII" into
"data_tab"
        Open table "data_tab" as data_table
        data_table_open = 1
      Case else
        Note "Wrong file name extension!"
              + "Acceptable file extensions are:"
              + "      TAB, DBF, WKS, XLS and TXT"
              + "Please try again."
        Exit sub
      End case
End if End Sub
'''*********************************************************

'''*********************************************************
Sub coordinate_file If (coordinate_table_open = 1) then   '''if table has been
open before, close it first.
   close table coordinate_table         '''Else will get error
   coordinate_table_open = 0
```

FIG.10N

```
End if coordinate_filename=FileOpenDlg("", "", "TAB", "Geo-coded
file or file containing coordinates")
If (coordinate_filename <> "") then '''If user open dialog
and chek cancel, will produce error.
                                '''This if statement prevents
that.
  Open Table coordinate_filename as coordinate_table
  coordinate_table_open = 1
  Alter Menu Item ID 605 Check '''"!Open file with
&coordinates" ID 605 calling coordinate_file,
End if End Sub
'''***********************************************************

'''***********************************************************
Sub data_loc_column Dim  n, no_of_column as smallint
Dim first_record_value as integer
Dim data_loc_col, plot_value as alias If (data_table_open = 0) then
  Note "Data file is not open yet!"
      + Chr$(10) +  "Please open a data file."
  Exit Sub
End if no_of_column = TableInfo(data_table, TAB_INFO_NCOLS)
Redim data_column_list(no_of_column)

For n = 1 to no_of_column
    data_column_list(n) = ColumnInfo (data_table, "COL"+n,
COL_INFO_NAME)
Next OnError goto Error_1   '''The popup display previous selected
col. number, however, if previous col. number
                      '''greater than current number
of columns, will get error.
Dialog
        Title "Data File Specifications"
```

FIG. 100

```
            Width  180
            Height 220
        Control StaticText
            Title "*** COMPLETE  A,  B  and  C ***" Position
25,8
        Control StaticText
            Title "A. Which column contains location
information?" Position 5,20
        Control PopupMenu   '''Listbox
            Position 35,35
            Width 80
            ID 1201
            Calling get_data_loc_column_no
            Title From Variable data_column_list
            Value Str$(Data_col_popup)
            Into data_loc_column_no
        Control StaticText
            Title "B. Graph will be plotted from:" Position 5,75
        Control RadioGroup
            Position 15,95
            ID 1203
            Calling get_plot_option
            Title "&Values in column-->;&Frequency count"   '''
next line is "of recards"
            Value 1
            Into plot_option   '''global variable, which option
checked
                               ''' 1=from frequency count, 2=from
column value
        Control StaticText
            Title "of records" Position 25,120  '''next line of
"frequency count"
        Control StaticText
            Title "pick a column if" Position 110,77
        Control StaticText
            Title "1st button is checked:" Position 98,85
        Control PopupMenu
            Position 92, 95
            Width 80
            ID 1205
            Calling get_plot_value_column_no
            Title From Variable data_column_list   '''global
variable, list of data columns
            Value Str$(plot_col_popup)
```

FIG. 10P

```
            Into plot_value_column_no '''global variable, which
column's value to be plotted
      Control StaticText
            Title "C. Is the data file geo-coded (i.e. has
coordinates)?" Position 5,150
      Control RadioGroup
            Position 35,162
            ID 1203
            Calling get_plot_option
            Title "Yes; No"
            Value 1
            Into geo_coded   '''global variable, which option
checked
                              ''' 1=yes, geo-coded, 2=no
      Control CancelButton
            ID 1207
            Position 38,195
            Width 50
            Title "Cancel"
      Control OKButton
            ID 1209
            Title "OK"
            Position 117,195
            Width 50

If not CommandInfo(CMD_INFO_DLG_OK) then
   exit sub
end if '''If cancel in dialog is check, exit the subroutine If (data_loc_column_no <> 0) then
   Alter Menu Item ID 615 Check '''"!Which &column has
location" ID 615 calling data_loc_column,
End if If (geo_coded = 2) then
   Alter Menu Item ID 605 Enable '''"(!3a: Open file with
&coordinates" ID 605 calling coordinate_file,
   Alter Menu Item ID 617 Enable '''"(!3b: Coordinates file
specifications" ID 617 calling coord_loc_column,
   Dialog
      Title "Helpful Hints"
      Width  175
      Height 130
   Control StaticText
```

FIG. 10Q

```
    Position 5,20
    Title "The data file does not contain coordinates,"
Control StaticText
    Position 15,30
    Title "hence the data cannot be plotted on the map."
Control StaticText
    Position 5,45
    Title "To add coordinates, go to menu items 3a and 3b."
Control StaticText
    Position 5,60
    Title "That is, open a file which contains:"
Control StaticText
    Position 5,75
    Title "o   locations of the data file, and"
Control StaticText
    Position 5,90
    Title "o   coordinates of the locations."
Control OKButton
    Title "OK"
    Position 60,110
    Width 50

End if data_col_popup = data_loc_column_no
plot_col_popup = plot_value_column_no Goto end_statement Error_1:    '''The popup display previous selected col.
number, however, if previous col. number
Note "error in Value 1"    '''greater than current number of
columns, will get error.
Resume Next    '''This is to reassign value to be 1 to avoid
error end_statement:
End Sub
'''*********************************************************

'''*********************************************************
Sub Get_data_loc_column_no
```

FIG. 10R

```
data_loc_column_no = ReadControlValue(1201) '''1201 is ID of
listbox in Sub data_loc_column
If CommandInfo(CMD_INFO_DLG_DBL) then
   data_loc_column_no = ReadControlValue(1201) '''if double
click, then assign it to '''data_loc_column_no directly,
                                              '''no need to
click ok-button
End if
End Sub
'''***********************************************

'''***********************************************
Sub Get_plot_option plot_option = ReadControlValue(1203) '''1203 is ID of listbox
in Sub data_loc_column
If CommandInfo(CMD_INFO_DLG_DBL) then
   plot_option = ReadControlValue(1203) '''if double click,
then assign it to '''data_loc_column_no directly,
                                              '''no need to
click ok-button
End if
End Sub
'''***********************************************

'''***********************************************
Sub Get_plot_value_column_no plot_value_column_no = ReadControlValue(1205) '''1205 is ID
of listbox in Sub data_loc_column
If CommandInfo(CMD_INFO_DLG_DBL) then
   plot_value_column_no = ReadControlValue(1205) '''if double
click, then assign it to '''data_loc_column_no directly,
                                              '''no need to
click ok-button
End if
End Sub
'''***********************************************
```

FIG. 10S

```
'''*********************************************************
Sub coord_loc_column Dim  n, no_of_column as smallint no_of_column = TableInfo(coordinate_table, TAB_INFO_NCOLS)
Redim coord_column_list(no_of_column)

For n = 1 to no_of_column
   coord_column_list(n) = ColumnInfo (coordinate_table,
"COL"+n, COL_INFO_NAME)
Next Dialog
  Title "Specifications For Coordinates File"
  Width  190
  Height 175
Control StaticText
  Title "Click the column which contains locations" Position
5, 10
Control Listbox
   Position 60,30
   Width 80
   Height 50
   ID 901
   Calling get_coord_loc_column_no
   Title From Variable coord_column_list
   Into coord_loc_column_no
Control StaticText
  Title "Notes:" Position 5, 90
Control StaticText
  Title "Locations from this clicked column will be" Position
15, 100
Control StaticText
  Title "matched with the locations from the data file."
Position 15, 108
Control StaticText
  Title "If a match is found, coordinates from this file"
Position 15, 120
Control StaticText
```

FIG. 10T

```
      Title "will be inserted into the data file." Position 15,
128
Control StaticText
   Title "Hence the program will be able to plot data on map."
Position 15, 139
Control CancelButton
   ID 903
   Position 38,155
   Width 50
   Title "Cancel"
Control OKButton
   ID 905
   Title "OK"
   Position 120,155
   Width 50

If (coord_loc_column_no <> 0) then
   Alter Menu Item ID 617 Check '''"!Which &column has
location" ID 617 calling coord_loc_column,
End if End Sub
'''*****************************************************

'''*****************************************************
Sub Get_coord_loc_column_no coord_loc_column_no = ReadControlValue(901)   '''901 is ID of
listbox in Sub coord_loc_column
If CommandInfo(CMD_INFO_DLG_DBL) then
   coord_loc_column_no = ReadControlValue(901)   '''if double
click, then assign it to '''coord_loc_column_no directly,
                                                 '''no need to
click ok-button
End if
End Sub
'''*****************************************************

'''*****************************************************
Sub Stack_style
```

FIG. 10U

```
Dialog
        Title "Stack Style of Symbols"
        Width   180
        Height  200
    Control StaticText
        Title "The Offset and Exponent values determine"
Position 5,10
    Control StaticText
        Title "how the symbols are to be stacked" Position
8,20
    Control StaticText
        Title "Offset X:" Position 30,35
    Control StaticText
        Title "Offset Y:" Position 30,48
    Control EditText
        Position 80, 35
        ID 1101
        Value Str$(Offset_x)
        Into Offset_x
    Control EditText
        Position 80, 48
        ID 1103
        Value Str$(Offset_y)
        Into Offset_y
    Control StaticText
        Title "Exponent X: " Position 30,63
    Control StaticText
        Title "Exponent Y:" Position 30,75
    Control EditText
        Position 80, 63
        ID 1105
        Value Str$(exponent_x)
        Into exponent_x
    Control EditText
        Position 80, 75
        ID 1107
        Value Str$(exponent_y)
        Into exponent_y
    Control StaticText
        Title "------------------------------------
--------------------------"
        Position 5,88
    Control StaticText
```

FIG. 10V

```
                Title "The way symobls are stacked is as follows:"
Position 5,100
      Control StaticText
            Title "Position of symbols = (Offset)^(exponent)"
Position 10,110
      Control StaticText
            Title "o Offset X = Offset Y: Stack upward in 45
degree." Position 5,125
      Control StaticText
            Title "o Offset X < Offset Y: Stack upward in > 45
degree." Position 5,135
      Control StaticText
            Title "o Exponent X and Y = 1: Upward linearly."
Position 5,145
      Control StaticText
            Title "o Exponent X < Exponent Y: Curve upward."
Position 5,155
      Control StaticText
            Title "o Exponent X > Exponebt Y: Curve downward."
Position 5,165
      Control CancelButton
            ID 1109
            Position 38,180
            Width 50
            Title "Cancel"
      Control OKButton
            ID 1111
            Title "OK"
            Position 110,180
            Width 50

If not CommandInfo(CMD_INFO_DLG_OK) then
   exit sub
end if ''' If cancel in dialog is check, exit the subroutine End Sub
'''*****************************************

'''*****************************************
Sub New_selection

Close All interactive

Alter Menu Bar add "&SymboGraph"
```

FIG. 10W

```
Create Menu "&SymboGraph" As
    "Complete items 1, 2 & 3 first",
    "!1: Open &map file" ID 601 calling map_file,
    "!2a: Open &data file" ID 603 calling data_file,
    "!2b: &Data file specifications" ID 615 calling
data_loc_column,
    "(!3a: Open file with &coordinates" ID 605 calling
coordinate_file,
    "(!3b: Coordinates &file specifications" ID 617 calling
coord_loc_column,
    "(-",
    "Define &symbol style" ID 607 Calling symbol_style,
    "Define s&tack style"  ID 609 calling stack_style,
    "(-",
    "&Plot graph" ID 619 Calling plot_graph,
    "&New selection" ID 621 Calling New_selection,
    "&Quit SymboGraph" ID 623 Calling Quit_SymboGraph Menu Bar Show '''Initialize values here
Map_filename=""
Data_filename=""
Coordinate_filename=""
data_loc_column_no = 0  '''at this point, user has not select
which column contains location
                            '''information, hence
    data_loc_column_no=0
coord_loc_column_no = 0  '''at this point, user has not select
which column contains location
no_per_symbol=1
plotmin=0
plotsymbol=Makesymbol(32,Red,8)
Offset_x = 0.1
Offset_y = 0.1
exponent_x = 1.0   '''default exponent value
exponent_y = 1.0   '''default exponent value
plot_tab_open = 0
default_no_per_symbol = 1   '''initial value
default_no_per_symbol_defined = 0   '''user has not opened
symbol style dialog
Summary_open =0   '''initially this table is not created
```

FIG. 10X

```
coordinate_table_open = 0    '''initially this table is not
opened, 0=not open, 1=open
data_table_open = 0          '''initially this table is not
opened
map_table_open = 0           '''initially this table is not
opened
map_table_no = 1      '''initial map file no.
data_col_popup = 1    '''initial value display in popup menu
plot_col_popup = 1    '''initial value display in popup menu End Sub
'''*****************************************

'''*****************************************
Sub Quit_SymboGraph

Close all interactive
Alter Menu Bar Remove "&SymboGraph"

End Sub
'''*****************************************
```

FIG.10Y

METHOD AND APPARATUS FOR DISPLAYING STACKED SYMBOLS TO CREATE A MULTI-DIMENSIONAL VIEW

BACKGROUND OF THE INVENTION

1. Field of the Invention

The invention relates to the field of data presentation and computer graphics. More specifically the invention relates to the stacking or arrangement of symbols on top of one another, creating a multi-dimensional visual impression in a geographic information system (GIS) environment. As a result, the invention provides the location and magnitude indications of data in a geographic information system (GIS) environment.

2. Description of the Related Art

In the present geographic information system environment, it is common practice to use different size of symbols to represent intensity or frequency of occurrence. For example, on a map of the United States, to indicate the location of major cities, one usually draws a dot on the map where each city is located. To indicate the population size of each city, one approach is to vary the size of the dot. That is, cities with higher populations will be represented by bigger dots. The advantage of this approach is that a viewer has direct impression of the relative size as well as the location of major cities. The disadvantage is that the dot size of some cities (such as New York) are so big compared to the others (such as Washington D.C.) that they may block other details (such as roads, states lines) on the map. Another approach is to use different colors (or symbols) to indicate different population sizes. The advantages is that it will not block other details on the map, because all cities have the same size of symbols. The disadvantage is that a viewer has to look at the legend to find out what color or what symbol representing what population sizes. Therefore this approach does not give the viewer a direct impression of the size and location. A variation of this approach is to use darker colors to represent higher populations. The is fine if there are only a few categories. If there are many categories, it will be difficult to distinguish which colors are darker. Another approach is to use a vertical or horizontal bar. The bar can be placed on the map where the city is located, to indicate location. The height or width of the bar is proportional to the city's population size, to indicate magnitude. By looking at the location and height (for vertical bar) or width (horizontal bar) of the bar, one can get an both location and magnitude impression. In this approach, although one can choose any color or size of the bar, however, one is limited to the single shape and form (that is, limited to the shape and form of a bar only).

The current invention is to provide another approach to both location and magnitude representations. To indicate the locations of major cities, as mentioned in the above example, each city will be represented by a symbol on the map. To indicate different population size of each city, repeated symbols will be stacked on top of each other. The higher the stack of symbols, the higher the population. One can choose any style, color or size of symbols. One can stack or arrange the symbols according to any mathematical functions.

SUMMARY OF THE INVENTION

The current invention provides both location and magnitude representations. To indicate the locations of major cities, for instance, each city will be represented by a symbol on the map. To indicate different population size of each city, repeated symbols will be stacked on top of each other. The higher the stack of symbols, the higher the population.

The number of the symbols to be stacked will be proportional to any scaling scheme. For instance, if one symbol represents 100,000 persons, a city with population between 500,001 and 600,000 will have 6 symbols stacked on top of one another, while a city with 100,000 or less will have a single symbol.

The way the symbols to be stacked will be as follows:

The position or coordinate of the symbols to be stacked will be based on any mathematical function. That is, the coordinate of the first or base symbol will be of certain initial value. The coordinate of the second, third, . . . symbol will be based on any mathematical function.

The size of the symbols to be stacked will be based on any mathematical function. That is, the size of the first or base symbol will be of certain initial value. The size of the second, third, . . . symbol will be based on any mathematical function.

The color of the symbols to be stacked will be based on any function applicable to color. That is, the color of the first or base symbol will be of certain initial value. The color of the second, third, . . . symbol will be based on any function applicable to color.

The shape of the symbols to be stacked will be based on any function applicable to shape or object, or according to a look-up table. That is, the shape of the first or base symbol will be of certain initial value. The shape of the second, third, . . . symbol will be based on any function applicable to shape or object. The symbol can be of any shape. Furthermore, the symbol can be two- or three-dimension.

BRIEF DESCRIPTION OF DRAWINGS

FIG. 6 is a table showing the number of accidents occurred in some intersections in San Francisco.

FIGS. 10A–10Y are a listing of source code for implementation in a geographic information system (GIS) software.

DETAILED DESCRIPTION OF THE INVENTION

Figure 1:
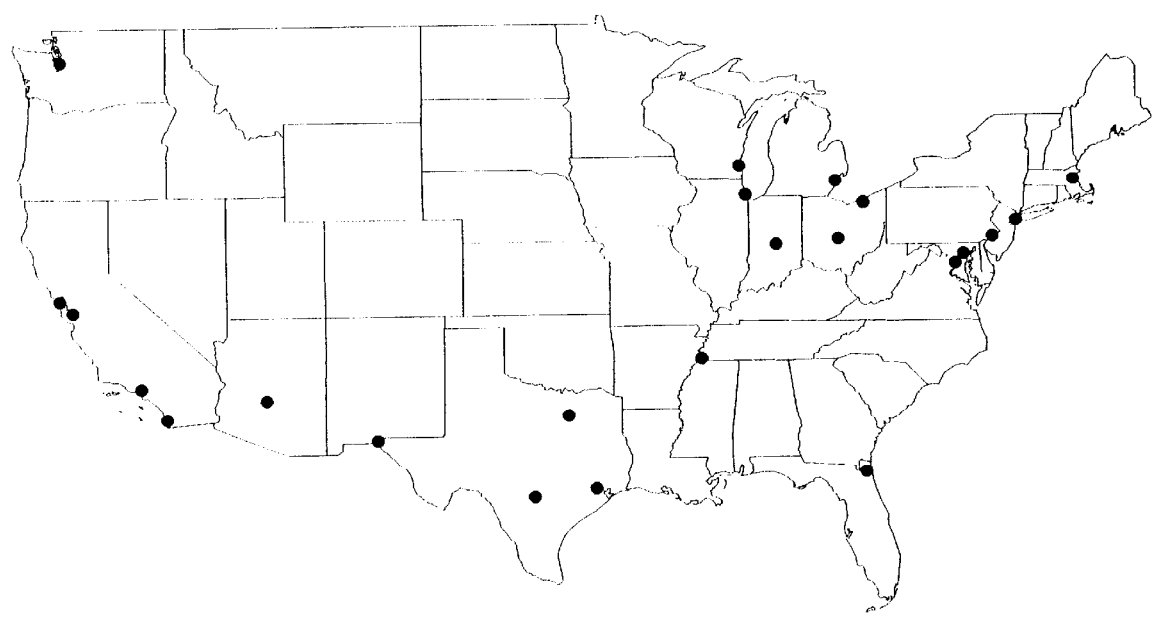
FIG. 1 is a map of United States showing the locations of major cities. The location of each city is represented by a symbol on the map.
Figure 2:
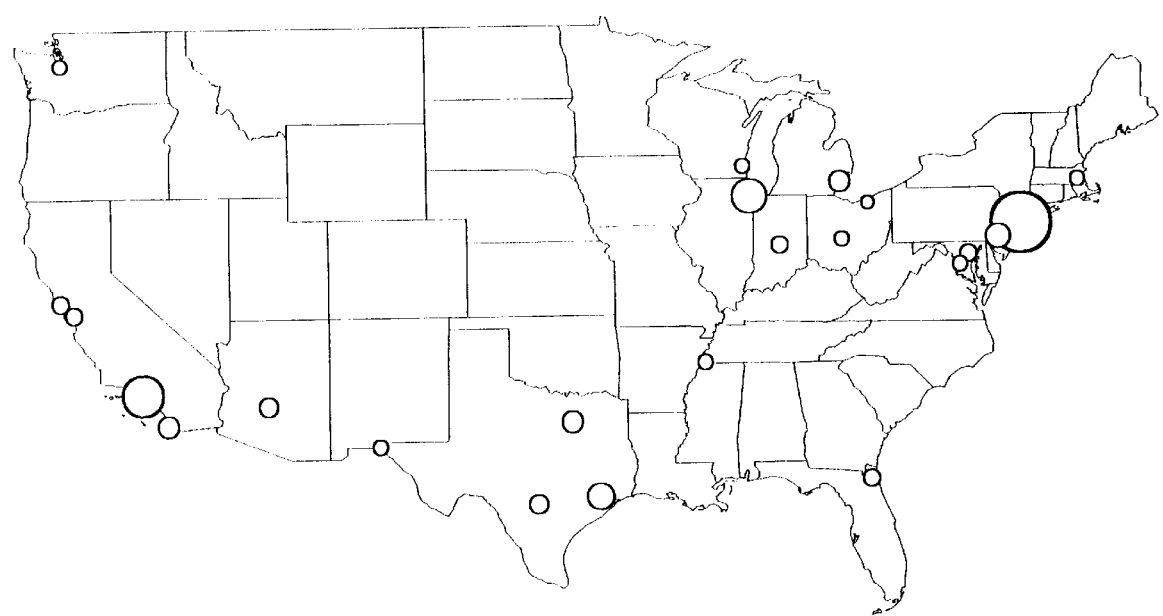
FIG. 2 is a map of United States showing the locations of major cities with different population sizes. Cities with higher populations are represented by a bigger circle on the map.
Figure 3:
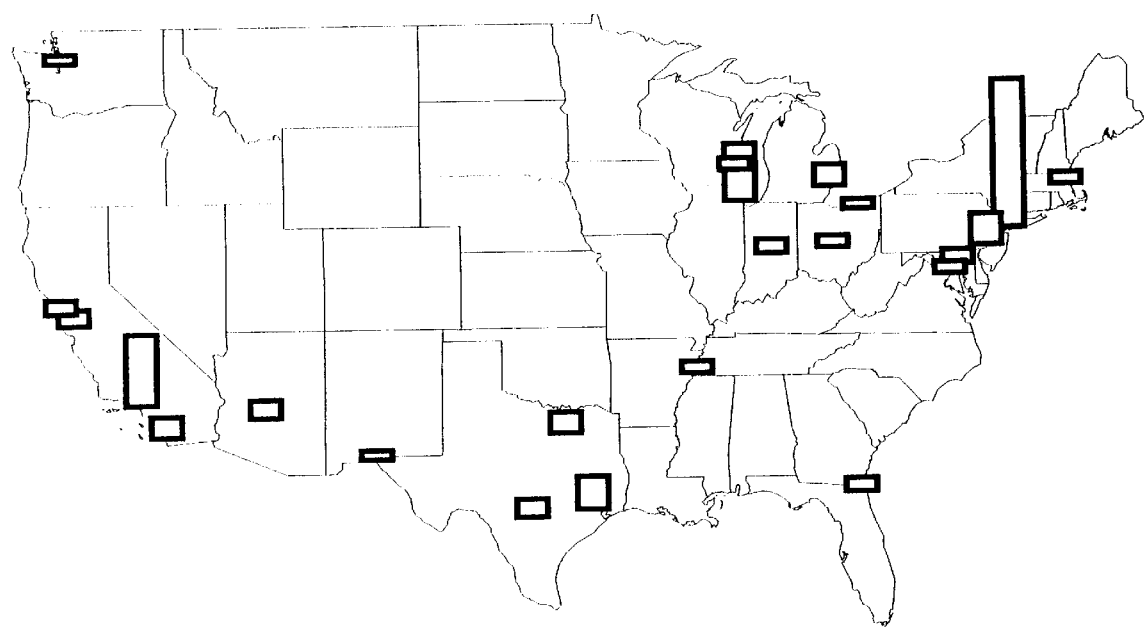
FIG. 3 is a map of United States showing the locations of major cities with different population sizes. Cities with higher populations are represented by higher vertical bars.

In order to understand the invention, a typical way of displaying location and magnitude of data will be first described. To indicate the locations of major cities in a map, say of the United States, each city will be represented by a dot on the map, as shown in FIG. 1. To indicate the population size of each city, one approach is to vary the size of the dot. That is, cities with higher populations will be represented by bigger dots, as shown in FIG. 2. Another approach is to use different heights of bars to indicate different population sizes, as shown in FIG. 3.

Figure 4:
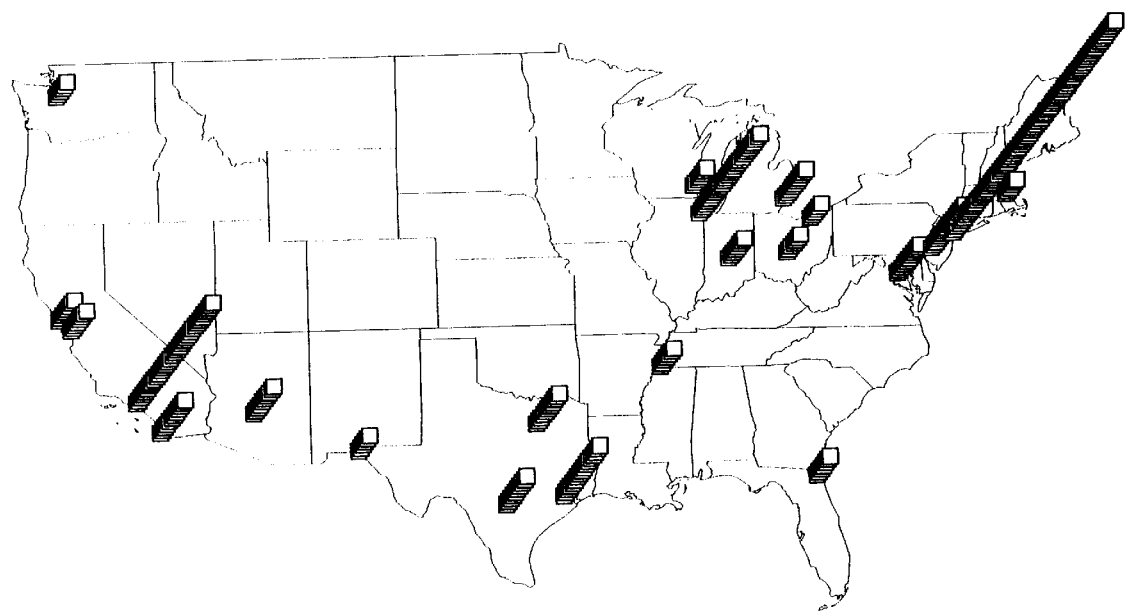
FIG. 4 is a an example of stacking of symbols to create multi-dimensional view. It consists of a map of United States showing the locations of major cities with different population sizes. Cities with higher populations have higher stack of symbols.
Figure 5A:
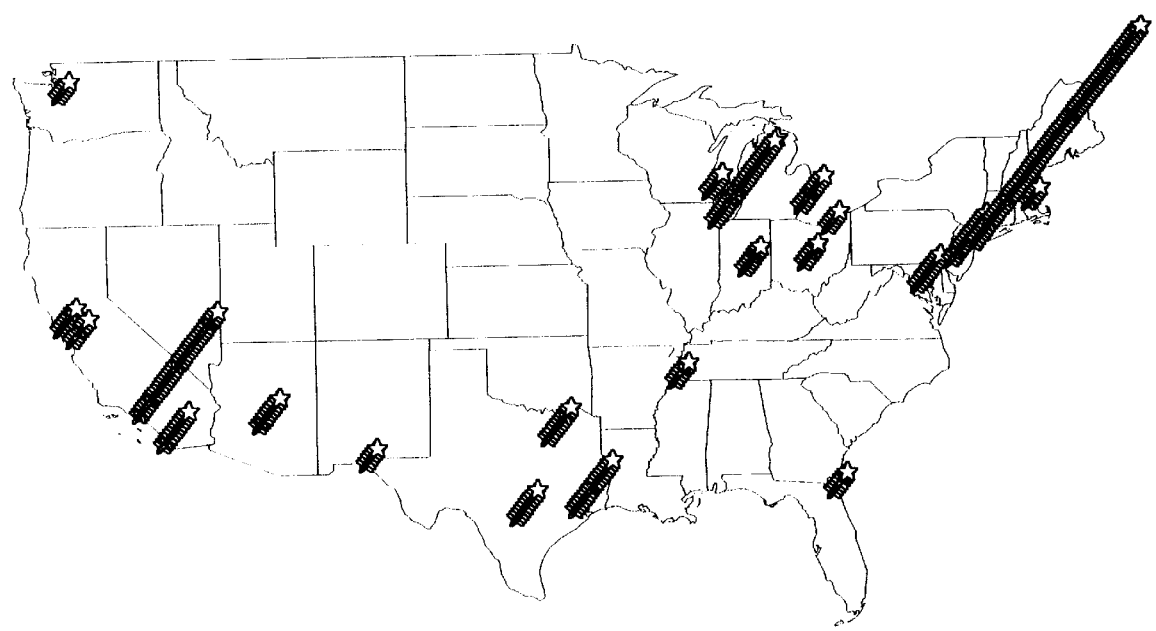
FIGS. 5A to 5G are similar to FIG. 4, except that different symbols and stacking functions are used to plot the symbols to represent population sizes.
Figure 5B:
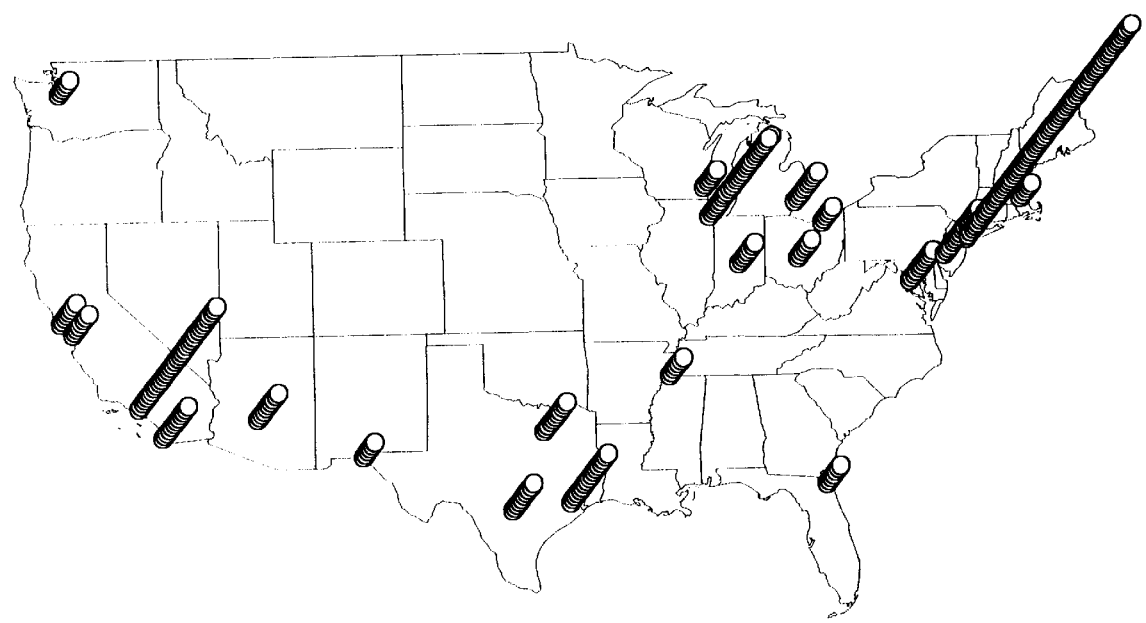
Figure 5C:
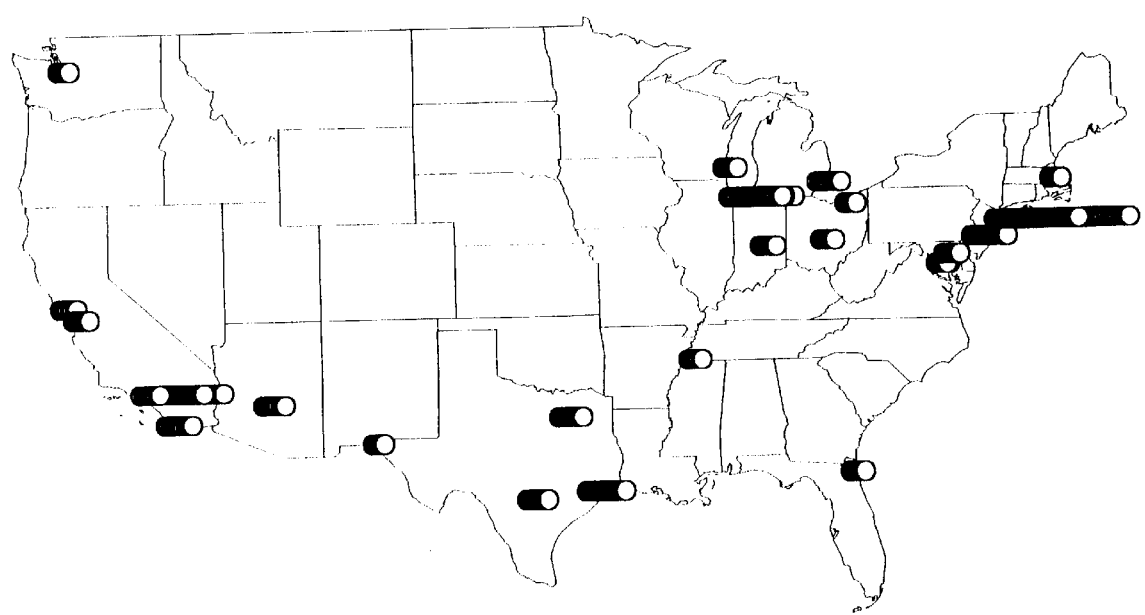
Figure 5D:
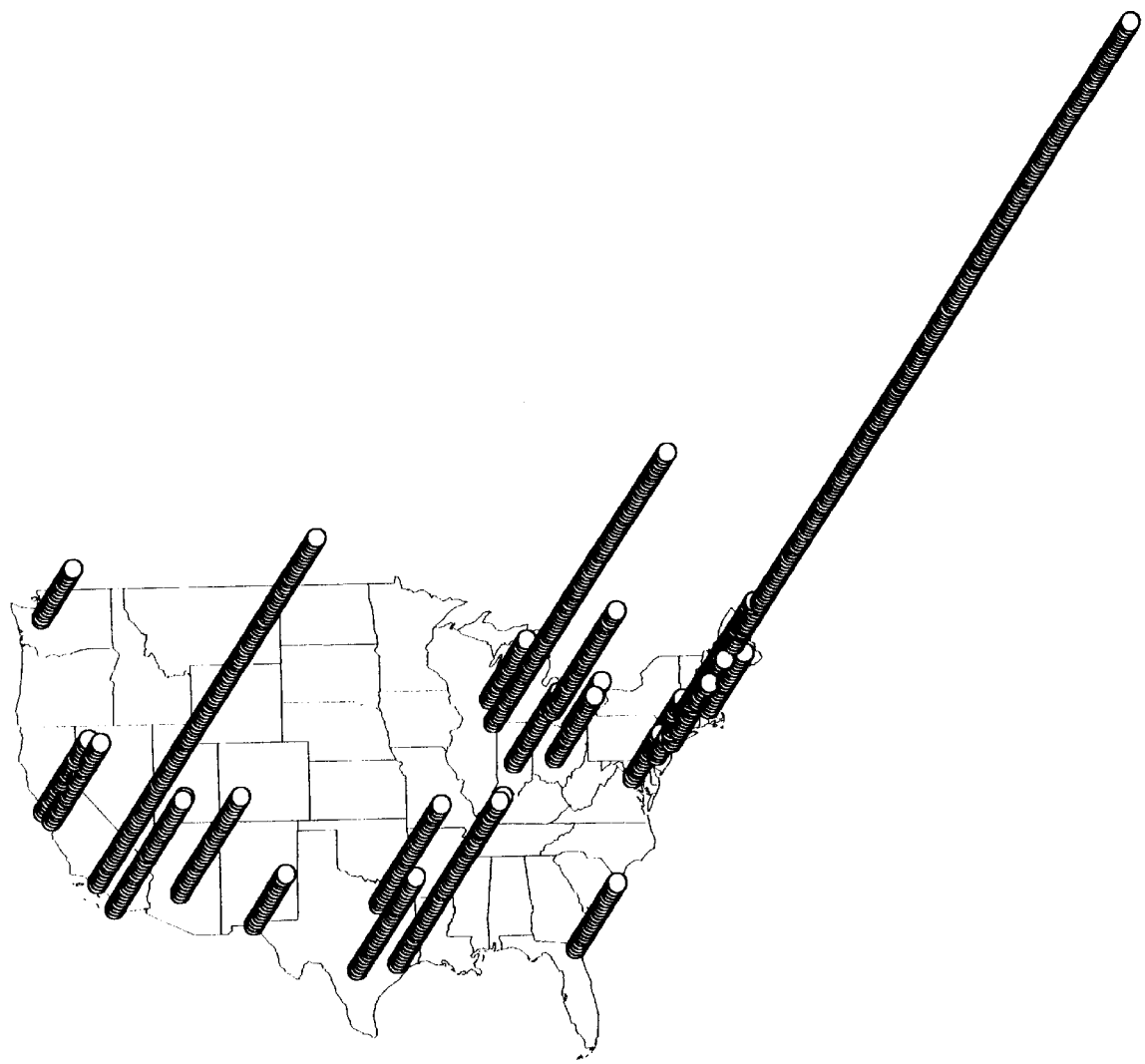
Figure 5E:
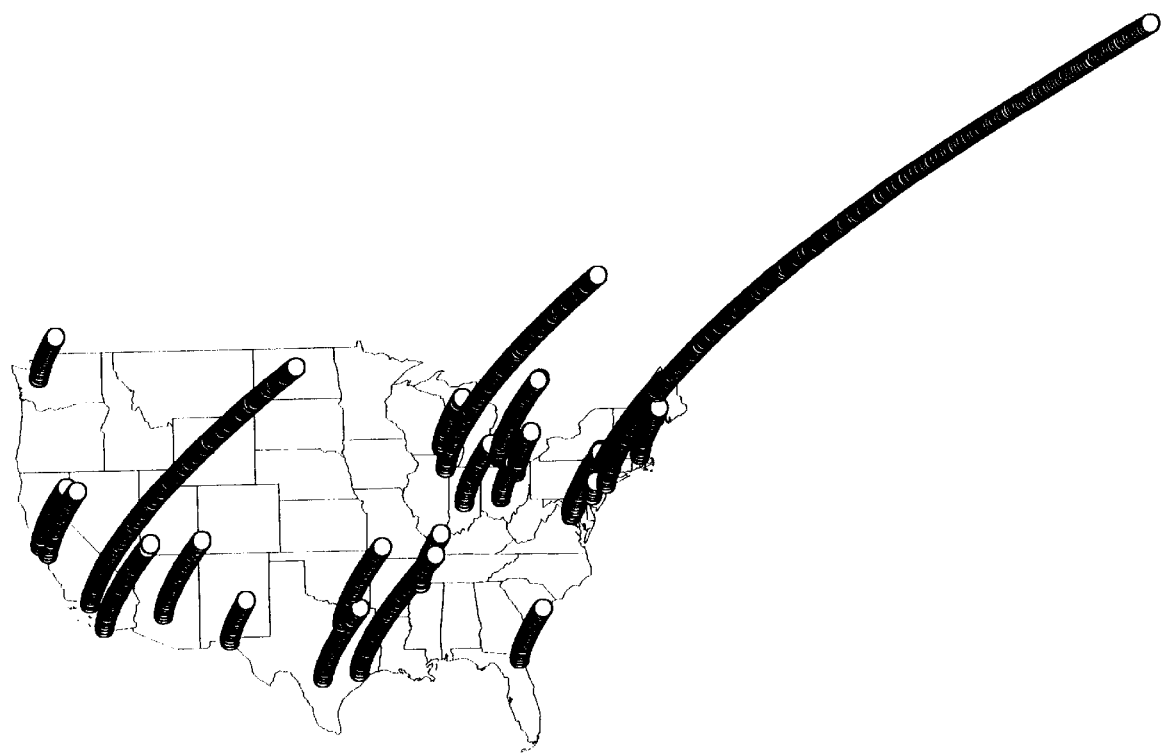
Figure 5F:
Figure 5G:
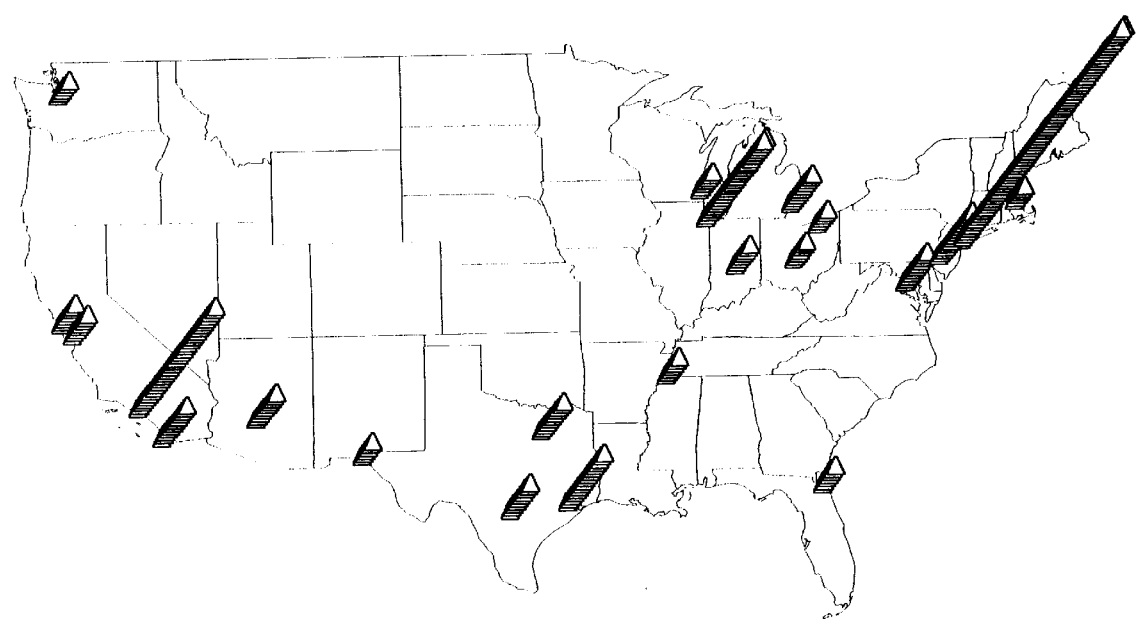
Figure 7:
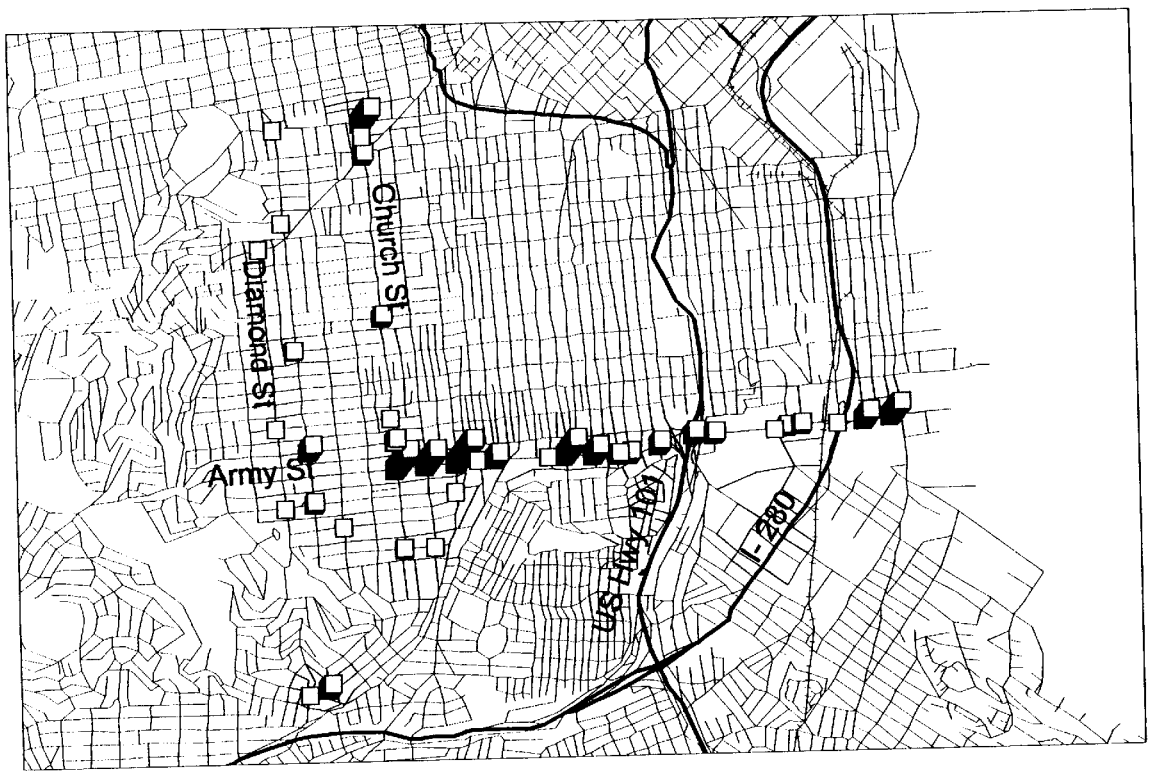
FIG. 7 is a map of San Francisco showing the locations of where accidents occurred and the relative number of accidents at each location. Locations with higher accidents have higher stack of symbols.
Figure 8A:
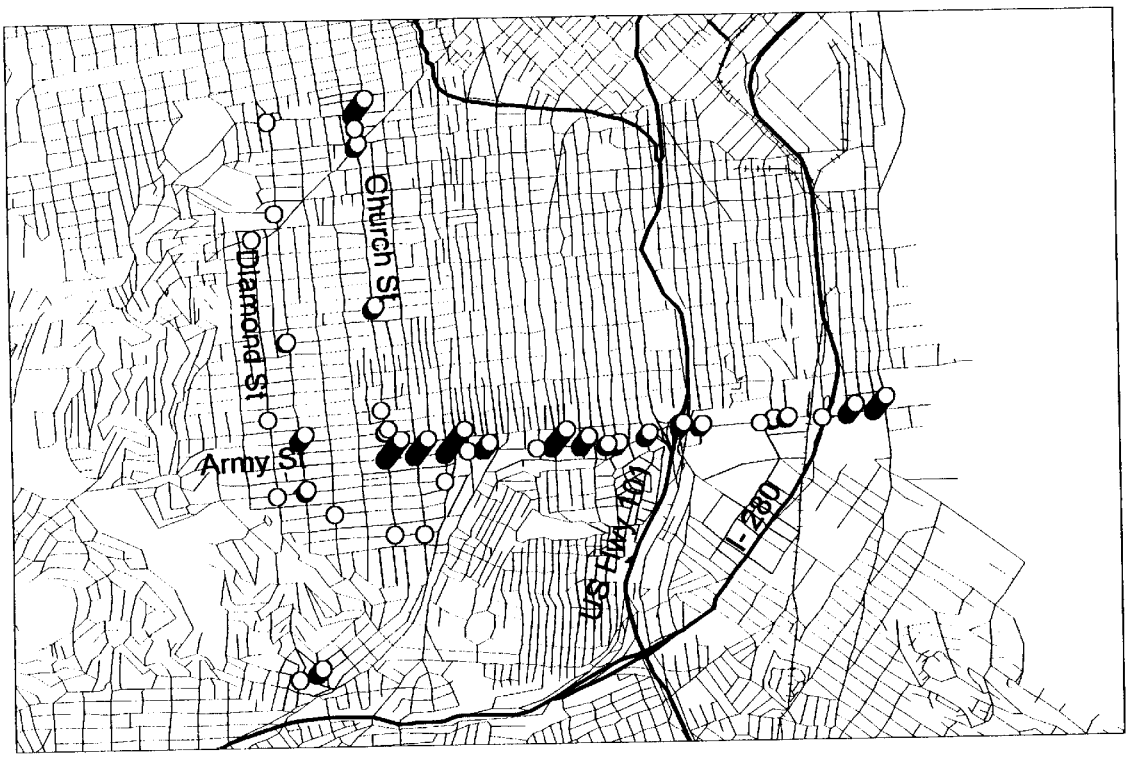
FIGS. 8A to 8D are similar to FIG. 7, except different symbol is used to plot the accidents and different zooming levels (or scales) of the map are shown.
Figure 8B:
Figure 8C:
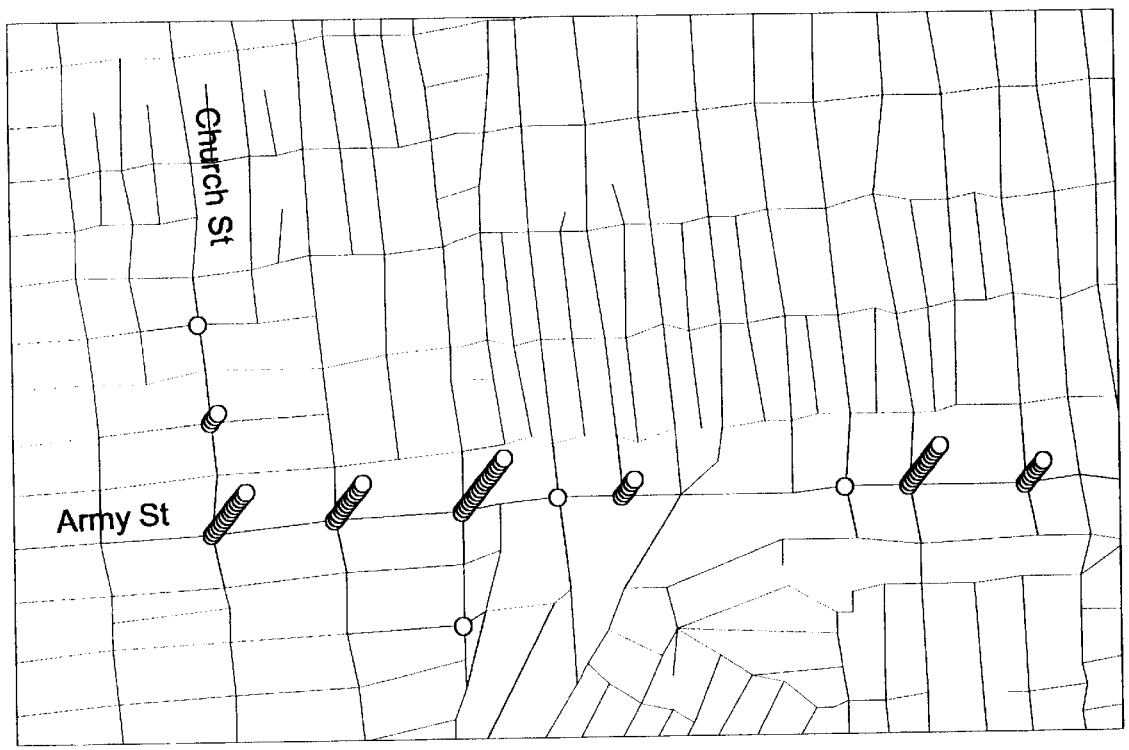
Figure 8D:
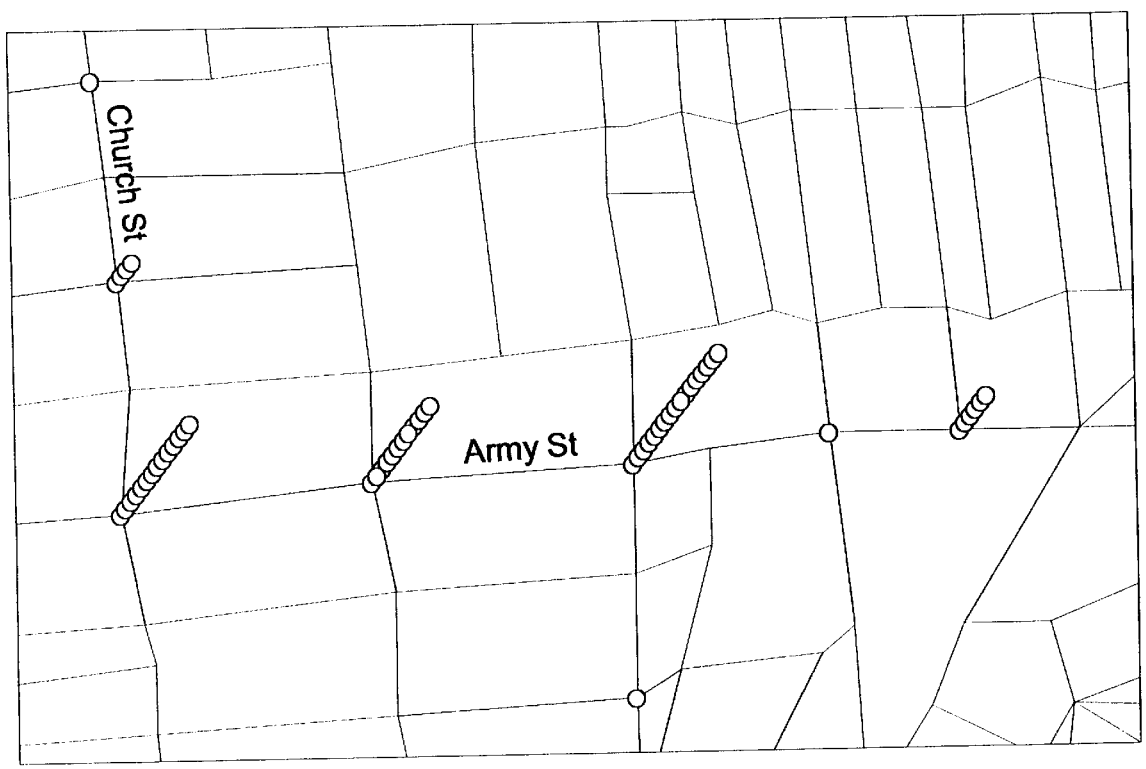

The invention is as follows. To indicate the locations of major cities in a map, say of the United States, each city will also be represented by a symbol on the map. To indicate different population size of each city, however, repeated symbols will be stacked on top of each other. The higher the stack of symbols, the higher the population, as shown in FIG. 4. The invention allows people to choose different symbols and different ways of stacking the symbols, as shown in FIGS. 5A to 5G. The invention can display any data. FIG. 6 shows the number of accidents occurred in some intersections in San Francisco. FIG. 7 shows how the location and number of accidents can be displayed on a map. In FIG. 7, if there is an accident occurred in an intersection, a symbol will be plotted on that intersection in the street map. Some intersections will have more accidents than the others. This phenomenon is also represented by FIG. 7—the higher the stack of symbols, the more the accidents occurring at that location. FIGS. 8A to 8D show different symbols and zoom levels of FIG. 7.

Figure 9:
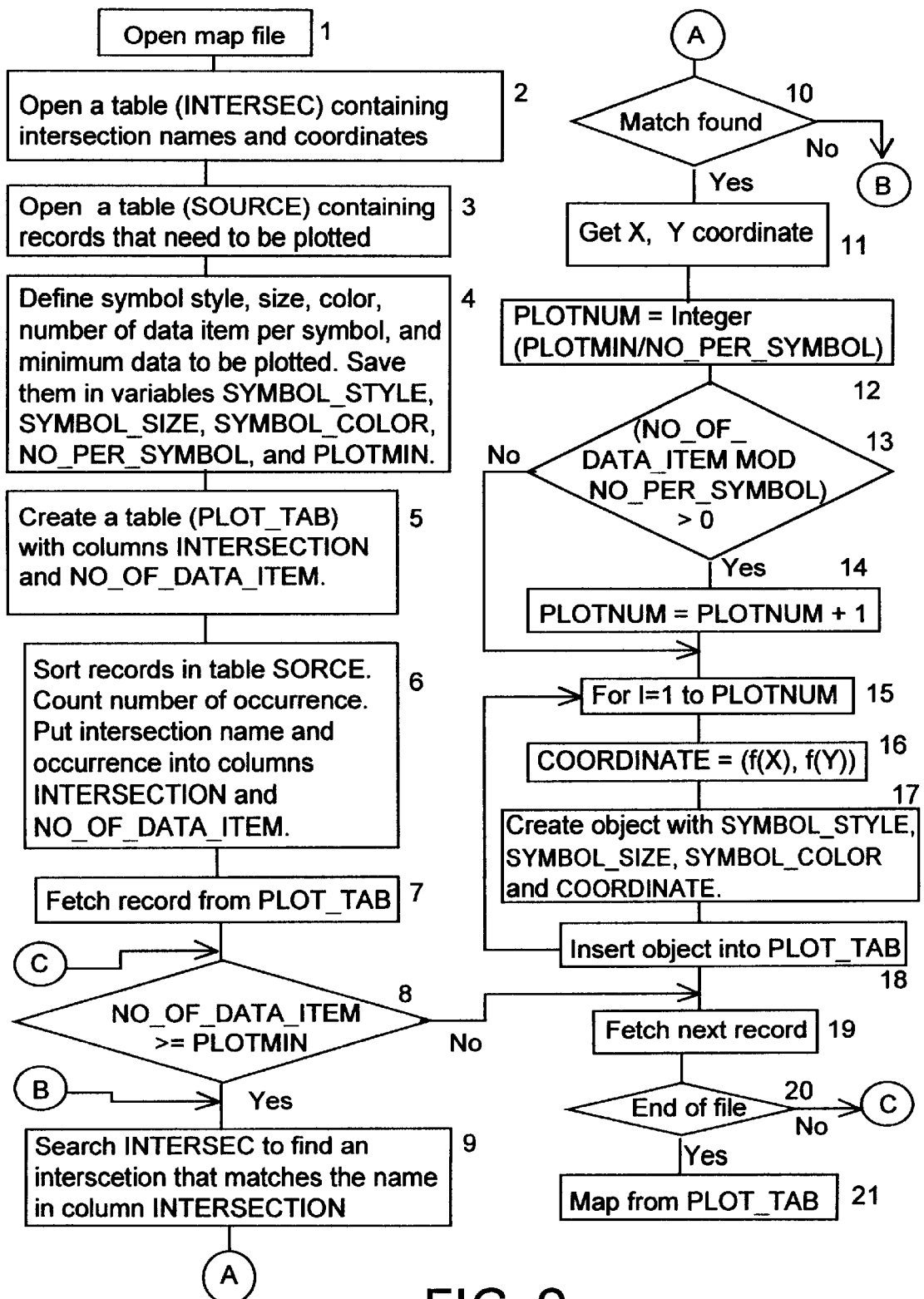
FIG. 9 is a flow chart showing how the symbols are stacked to create multi-dimensional view.

FIG. 9 shows how the symbols are stacked to create multi-dimensional view in a geographic information system (GIS) software. In step 1, the GIS software opens the street map files for displaying the street map. In step 2, the GIS software opens a file containing a look-up table of intersection name and the coordinates of each intersection. Name this table INTERSEC. In step 3, the GIS software opens the table or file containing all records that need to be plotted on the street map. Name this table as SOURCE. This table or file is usually resulted from sorting through a raw file with records meeting user defined criteria. Step 4 is a mechanism of getting user's input regarding style, size, and color of each symbol; the number of data item per symbol; and the minimum number of data item to be plotted. This is usually in the form of a dialog box where the user can pick or fill in the blank for such information. These information are then stored in variables SYMBOL_STYLE, SYMBOL_SIZE, SYMBOL_COLOR, NO_PER_SYMBOL and PLOT-MIN respectively. In step 5, a table with two columns, INTERSECTION and NO_OF_DATA_ITEM, is created. Name this table as PLOT_TAB. Make this table mappable, that is, this table will contain mappable objects. In step 6, sort the records in table SOURCE according to intersection name. Then count the number of occurrence for each intersection. For each record of table SOURCE, put the intersection name and its occurrence respectively into columns INTERSECTION and NO_OF_DATA_ITEM of each record of table PLOT-TAB. That is, if intersection AAA occurred in table SOURCE 5 times, table PLOT_TAB will have 5 records. Each of these 5 records will have an "AAA" under the INTERSECTION column and a "5" under the NO_OF_DATA_ITEM column. In step 7, fetch the first record from table PLOT_TAB. Step 8 checks if column NO_OF_DATA_ITEM greater than or equal to PLOT-MIN. If no, meaning no need to plot the data, then go to the next record. If yes, then go to step 9. In step 9, get the intersection name from INTERSECTION column of current record, then search table INTERSEC to find a matching intersection name. If a match is found, in step 10, then get the intersection's x and y coordinates from table INTERSEC, in step 11. In step 12, define PLOTNUM as an integer function of PLOTMIN divided by NO_PER_SYMBOL. PLOTNUM is the number of stacked symbols to be plotted. In step 13, check if NO_OF_DATA_ITEM modulus NO_PER_SYMBOL greater than 0. If yes, then PLOTNUM equals PLOTNUM+1, in step 14. If no, skip step 14. In step 15, for I equals 1 to PLOTNUM, repeat steps 16, 17 and 18. Step 16 is to save the coordinate in variable COORDINATE. The coordinate can be any function of x and y, where x and y are obtained from table INTERSEC in step 11. In step 17, create an object which has the attributes as defined by the following variables: SYMBOL_STYLE, SYMBOL_SIZE, SYMBOL_COLOR, and COORDINATE. In step 18, insert the object into table PLOT_TAB. In step 19, fetch next record from table PLOT_TAB. In step 20, check if table PLOT_TAB has reached the end of file. If no, go to step 8. If yes, plot or map from table PLOT_TAB.

In step 6, If table SOURCE has already contain the name of intersection and the number of occurrence per intersection, then we do not need to sort table SOURCE. We simply put the intersection name and its occurrence respectively into columns INTERSECTION and NO_OF_DATA_ITEM of each record of table PLOT-TAB. That is, if intersection AAA occurred in table SOURCE 5 times, table PLOT_TAB will have 5 records. Each of these 5 records will have an "AAA" under the INTERSECTION column and a "5" under the NO_OF_DATA_ITEM column.

We used street map as the geographic location reference and we used intersection as the locational point to be plotted. One can use any map or any geographic location reference. One can use any locational points to be plotted.

FIGS. 10A–10Y are examples of the source code to be used in MapInfo. MapInfo is a commercially available GIS software from MapInfo Corporation, Troy, N.Y. The source code in FIGS. 10A–10Y are examples of how the invention can be implemented in a commercial GIS product. Similar source code can be adapted for use in any other commercial GIS product.

I claim:

1. A method for creating a multi-dimensional visual representation of underlying information comprising the steps of:

reading geographic information;

reading source information to be plotted in relation to the geographic information;

sorting the source information in accordance with geographic coordinates of the geographic information;

displaying plural stacks of symbols in accordance with respective geographic coordinates, the number of symbols in each stack being indicative of the quantity of the source information associated with each set of geographic coordinates, the stacks comprising the symbols arranged in accordance with a predetermined mathematical stacking function.

2. A method as recited in claim 1, further comprising the step of inputting symbol information related to the symbols displayed in said displaying step.

3. A method as recited in claim 2, wherein the symbol information in said inputting step comprises at least one of information relating to a symbol style, information relating to a symbol size, information relating to a symbol color, and information relating to a value of the quantity of the source information represented by each symbol.

4. A method as recited in claim 3, wherein said step of reading geographic information comprises opening a file containing a lookup table of geographic coordinates in a standard GIS format, said step of reading source information comprises opening a file containing records of the source information, said step of inputting comprises displaying a dialog box for a user to enter the symbol information, and said step of sorting comprises creating a mapable table having columns corresponding to the geographic coordinates and the source information.

5. A method as recited in claim 4, wherein said step of displaying, comprises generating plural symbols in accordance with the symbol information, arranging the symbols into the plural stacks in accordance with the stacking function and the mapable table, and displaying the plural stacks.

6. A method as recited in claim 1, wherein the stacking function is linear.

7. A method as recited in claim 1, wherein the stacking function is non-linear.

8. An apparatus for creating a multi-dimensional visual representation of underlying information comprising:
   means for reading geographic information;
   means for reading source information to be plotted in relation to the geographic information;
   means for sorting the source information in accordance with geographic coordinates of the geographic information;
   means for displaying plural stacks of symbols in accordance with respective geographic coordinates, the number of symbols in each stack being indicative of the quantity of the source information associated with each set of geographic coordinates, the stacks comprising the symbols arranged in accordance with a predetermined mathematical stacking function.

9. An apparatus as recited in claim 8, further comprising means for inputting symbol information related to the symbols.

10. An apparatus as recited in claim 9, wherein the symbol information comprises at least one of information relating to a symbol style, information relating to a symbol size, information relating to a symbol color, and information relating to a value of the quantity of the source information represented by each symbol.

11. An apparatus as recited in claim 10, wherein said means for reading geographic information comprises means for opening a file containing a lookup table of geographic coordinates in a standard GIS format, means for reading source information comprises means for opening a file containing records of the source information, said means for inputting comprises means for displaying a dialog box for a user to enter the symbol information, and said means for sorting comprises means for creating a mapable table having columns corresponding to the geographic coordinates and the source information.

12. An apparatus as recited in claim 11, wherein said means for displaying, comprises means for generating plural symbols in accordance with the symbol information, means for arranging the symbols into the plural stacks in accordance with the stacking function and the mapable table, and means for displaying the plural stacks in a visible form.

13. An apparatus as recited in claim 8, wherein the stacking function is linear.

14. An apparatus as recited in claim 8, wherein the stacking function is non-linear.

15. A multi-dimensional display representation of underlying geographic and source information in which the source information indicates quantities related to geographic coordinates of the geographic information, said display comprising:
   a map representing the geographical information;
   plural stacks of symbols positioned in accordance with respective geographic coordinates of the map, the number of symbols in each of said stacks being indicative of the quantity of the source information associated with each set of geographic coordinates, said stacks comprising said symbols arranged in accordance with a predetermined mathematical stacking function.

* * * * *